US009386158B2

(12) United States Patent
Wood et al.

(10) Patent No.: US 9,386,158 B2
(45) Date of Patent: *Jul. 5, 2016

(54) CONTROLLER FOR THE INTELLIGENT INTERCONNECTION OF TWO COMMUNICATION NETWORKS, AND METHOD OF USE FOR SAME

(71) Applicant: Focal IP, LLC, Wilmington, DE (US)

(72) Inventors: Samuel F. Wood, Los Altos, CA (US); Jerry A. Klein, Los Altos, CA (US); Margaret Susan Asprey, Los Altos, CA (US)

(73) Assignee: Focal IP, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,243

(22) Filed: Jun. 11, 2015

(65) Prior Publication Data
US 2015/0312420 A1 Oct. 29, 2015

Related U.S. Application Data

(60) Continuation of application No. 13/905,036, filed on May 29, 2013, now Pat. No. 9,083,719, which is a
(Continued)

(51) Int. Cl.
H04L 12/66 (2006.01)
H04M 7/00 (2006.01)
(Continued)

(52) U.S. Cl.
CPC .......... H04M 7/0003 (2013.01); H04L 65/1046 (2013.01); H04M 3/42153 (2013.01);
(Continued)

(58) Field of Classification Search
CPC .......... H04L 65/1046; H04M 3/42153; H04M 3/42161
USPC ...................... 370/352; 379/220.01
See application file for complete search history.

(56) References Cited

U.S. PATENT DOCUMENTS 8,155,298 B2  4/2012 Wood et al.
8,345,711 B2 * 1/2013 Archer ................. H04L 29/06
                                              370/401
2007/0269024 A1 * 11/2007 Dalrymple ............ H04M 11/04
                                              379/37

OTHER PUBLICATIONS

"BellSouth® Centrex User Guide", BellSouth Business, Copyright 1999 BellSouth®, (20 pages).
(Continued)

Primary Examiner — Creighton Smith
(74) Attorney, Agent, or Firm — Blakely Sokoloff Taylor & Zafman LLP

(57) ABSTRACT

A caller ID based call routing feature. A processing system in the public switched telephone network (PSTN) receives first identifying information for identifying the source of a telephone call and associates additional information stored in a memory with the first identifying information. The additional information may then be transmitted to the subscriber via the Internet for display. Another feature is a branch calling feature where the subscriber may program a processing system within the PSTN to forward an incoming call to two or more end units (e.g., telephones) simultaneously. If the call at an end unit is answered, answer supervision signaling is transmitted back to the processing system which then terminates all other calls. The processing system then connects the calling party to the subscriber. The branch calling may be made for any combination of local, long distance, and cellular telephone numbers.

15 Claims, 11 Drawing Sheets

Related U.S. Application Data continuation of application No. 12/821,119, filed on Jun. 22, 2010, now Pat. No. 8,457,113, which is a continuation of application No. 11/948,965, filed on Nov. 30, 2007, now Pat. No. 7,764,777, which is a division of application No. 10/426,279, filed on Apr. 30, 2003, now Pat. No. 7,324,635, which is a continuation-in-part of application No. 09/565,565, filed on May 4, 2000, now Pat. No. 6,574,328.

(51) Int. Cl.
   *H04M 3/42*       (2006.01)
   *H04Q 3/00*       (2006.01)
   *H04Q 3/66*       (2006.01)
   *H04Q 3/72*       (2006.01)
   *H04L 29/06*      (2006.01)
   *H04M 7/12*       (2006.01)

(52) U.S. Cl.
   CPC ........ *H04M3/42161* (2013.01); *H04M 7/0009* (2013.01); *H04Q 3/005* (2013.01); *H04Q 3/0025* (2013.01); *H04Q 3/66* (2013.01); *H04Q 3/72* (2013.01); H04M 3/42229 (2013.01); H04M 7/12 (2013.01); H04Q 2213/1313 (2013.01); H04Q 2213/13034 (2013.01); H04Q 2213/13091 (2013.01); H04Q 2213/13097 (2013.01); H04Q 2213/13103 (2013.01); H04Q 2213/13109 (2013.01); H04Q 2213/13141 (2013.01); H04Q 2213/13242 (2013.01); H04Q 2213/13332 (2013.01); H04Q 2213/13389 (2013.01)

(56) References Cited

OTHER PUBLICATIONS

"Common Channel Signaling System No. 7", MT20-320-201, Concepts & Technologies, Nov. 1988, (16 pages).
"General Recommendations on Telephone Switching and Signalling—Intelligent Network", Introduction to Intelligent Network Capability Set 1, ITU-T Recommendation Q.1211, Telecommunication Standarization Sector of ITU, Mar. 1993, (34 pages).
Huitema, Christian, et al., "Architecture for Internet Telephony Services for Residential Customers", Bellcore, Mar. 2, 1999, (pp. 1-14).
Martikainen, Olli, et al., "Tutorial on Intelligent Networks", IFIP IN '95 Conference, Copenhagen 28.-31.8.1995, (99 pages).
Matsinopoulos, Panayotis , "CORBA / IN Integration", University College London, Department of Electronic & Electrical Engineering, Telecommunications Masters Programme, Dissertation, London, Aug. 1998, (155 pages).
Minoli, Dan, "Common Channel Signaling System No. 7", DATAPRO, Managing Voice Networks, 8420 Standards, Feb. 1995, (17 pages).
Minoli, Dan, "Signaling Concepts", DATAPRO, Managing Voice Networks, 2012 Voice Networking Concepts, Mar. 1995, (pp. 1-12).
Case No. 3:15-cv-747, Court: M.D. Fla, *Patent Asset Licensing, LLC v. T3 Communications, Inc.*, (Jun. 19, 2015), 6.
Case No. 3:15-cv-742, Court: M.D. Fla, *Patent Asset Licensing, LLC v. Bright House Netwroks, LLC*, (Jun. 19, 2015), 6.
Case No. 3:15-cv-743, Court: M.D. Fla., *Patent Asset Licensing, LLC v. WideOpenWest Finance, LLC and Knology of Florida, Inc.*, (Jun. 19, 2015), 6.
Case No. 3:15-cv-744, Court: M.D. Fla., *Patent Asset Licensing, LLC v. YMAX Corp.*, (Jun. 19, 2015), 6.
Case No. 3:15-cv-746, Court: M.D. Fla., *Patent Asset Licensing, LLC v. Birch Communications, Inc.*, (Jun. 19, 2015), 6.

* cited by examiner

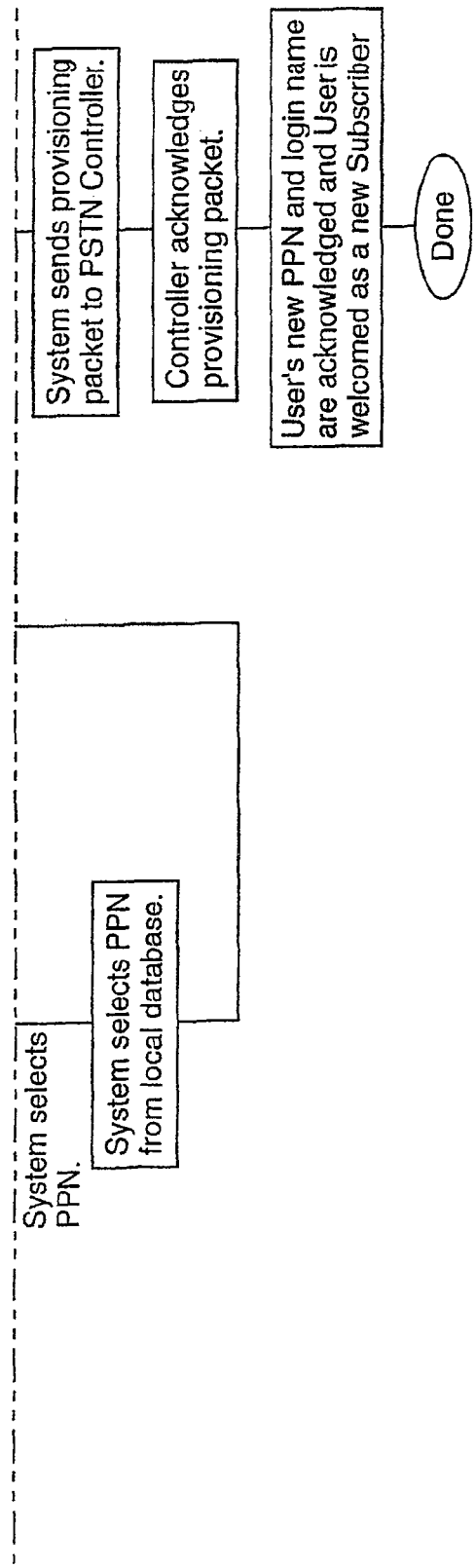
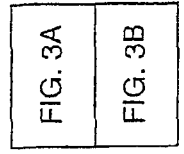
FIG. 3B
FIG. 3

ID_9,386,158_B2

CONTROLLER FOR THE INTELLIGENT INTERCONNECTION OF TWO COMMUNICATION NETWORKS, AND METHOD OF USE FOR SAME

RELATED APPLICATIONS

This application is a continuation of U.S. patent application Ser. No. 13/905,036, filed May 29, 2013, which is a continuation of U.S. patent application Ser. No. 12/821,119, filed Jun. 22, 2010 (which issued as U.S. Pat. No. 8,457,113 on Jun. 4, 2013), which is a continuation of U.S. patent application Ser. No. 11/948,965, filed Nov. 30, 2007 (which issued as U.S. Pat. No. 7,764,777 on Jul. 27, 2010), which is a divisional of U.S. patent application Ser. No. 10/426,279, filed Apr. 30, 2003 (which issued as U.S. Pat. No. 7,324,635 on Jan. 29, 2008), which is a continuation-in-part of U.S. patent application Ser. No. 09/565,565, filed May 4, 2000 (which issued U.S. Pat. No. 6,574,328 on Jun. 3, 3003). The subject matter in the above-identified co-pending and commonly owned application is incorporated herein by reference.

FIELD OF THE INVENTION

This invention relates to telephone services and, in particular, to a system for allowing a subscriber to select features of the subscriber's telephone service and to various novel features that can be selected.

BACKGROUND OF THE INVENTION

People have used various means for limiting interruptions due to the telephone. In the past, people used switchboards and secretaries to screen incoming, or inbound, calls. Voice mail systems took over some of this role both in the home and in the central office. Today, there are web-based companies managing 3rd-party call control, via the toll-switch network, which allow users to enter call control information through a web portal. There are also edge devices in each of the public telephone company's central offices which provide local control, but offer an extremely limited number of features and do not provide true 3rd-party call control.

The web-based toll systems provide good user interaction but they are not economical and cannot take advantage of local number portability because they do not provide local control and connectivity.

The Public Switched Telephone Network (PSTN) consists of a plurality of edge switches connected to telephones on one side and to a network of tandem switches on the other. The tandem switch network allows connectivity between all of the edge switches, and a signaling system is used by the PSTN to allow calling and to transmit both calling and called party identity.

Until now, optional features were provided by the local service telephone company (telco) through the edge switch at the central office (CO). It was not possible to provide optional features through any other means. Control of these features was done through the first party (calling party) or the second party (called party), or worse yet, manually by calling the business office.

In the past, numerous devices have been built that allow the connection of two lines together at an edge switch. These devices can be used to add features to a telephone network by receiving a call on one line and then dialing out on another line. The problem with these devices is that, because they are connected through an edge switch, transmission losses and impairments occur, degrading the overall connection. In addition, signaling limitations prevent full control, by the subscriber or the system, over the call.

A preferred embodiment of the inventive system described herein connects at the tandem, thereby eliminating these problems.

In the edge devices residing in the PSTN central offices, the 1st party (the calling party) has numerous features available (dialing options). The 2nd party (called party) also has options available such as call forwarding, but these features typically require access from the first or second party's device and are extremely awkward to program. The user interaction is not only awkward, it is limited and requires interaction with the telephone company to provision them. In other words, past systems for provisioning, meaning addition, modification, or control of telephone features, required a subscriber to make the feature selection through the telephone business office. Central office workers would then implement the provisioning under request of the business office.

Call Forwarding is one popular provision. There is signification transmission degradation for Call Forwarding to take place. The calling party pays for a call to the edge device, and the edge subscriber, the called party, pays for the call to the forwarding number. For enhanced inbound call control to occur, a direct 3rd-party call control means is needed.

A variety of services have arisen to address the problems mentioned above. Many of these systems allow the called party to make changes to his/her call forwarding attributes which do not allow direct 3rd-party call control. These services provide good user interaction, some via the internet, but they rely upon the toll network through the use of "800" numbers.

This requires the subscriber to pay by the minute and does not allow the subscriber to take advantage of number portability in order to obtain 3rd-party call control. There are other toll network mechanisms for remote call forwarding. For example, MCI offers a service where the customer can remotely change the forwarding target number for "800" numbers. Contacting the ultimate end-user before terminating the first incoming call is similar to the manner in which "800" credit calls and collect calls are processed, but these are not done at the local subscriber level.

In addition to these toll services, there are edge devices that perform some of the same services. Edge devices such as phones and PBXs that include voice mail, inter-active voice response, call forwarding, speed calling, etc., have been used to provide additional call control. These devices allow the phone user direct control over incoming and outgoing calls. The disadvantage of edge devices is that they add cost, degrade voice and transmission quality, can be difficult to program, are not easily programmed remotely, can require the user to pay for two lines, provide lower quality of service, and cannot provide the same level of functionality as a system that controls the PSTN directly. There are Voice Over Internet Protocol (VoiP) products emerging that provide better user interfaces and control but they do not take advantage and voice quality of the PSTN.

BRIEF SUMMARY OF THE INVENTION

A method comprising receiving at a controller call data which is associated with a first call via a first communication network, accessing control criteria by the controller based upon the call data, initiating a second call via a second communication network by the controller using the call data and the control criteria, wherein the first and the second communication networks are each a voice over IP (VOIP) network, and enabling communication between the first call and the second call by the controller.

A controller including circuitry and/or software configured to receive call data which is associated with a first call via a first communication network, access control criteria based upon the call data, initiate a second call via the second communication network using the call data and the control criteria, wherein the first and the second communication networks are each a voice over IP (VOIP) network, and enable communication between the first call and the second call.

Other objects and features of the present invention will become apparent by a review of the specification, claims and appended figures.

BRIEF DESCRIPTION OF THE DRAWINGS

FIGS. 3A and 3B is a flowchart of one method that a person may use to set up a subscriber account and to designate features the subscriber would like for his/her telephone.

DETAILED DESCRIPTION OF THE INVENTION

Figure 1:
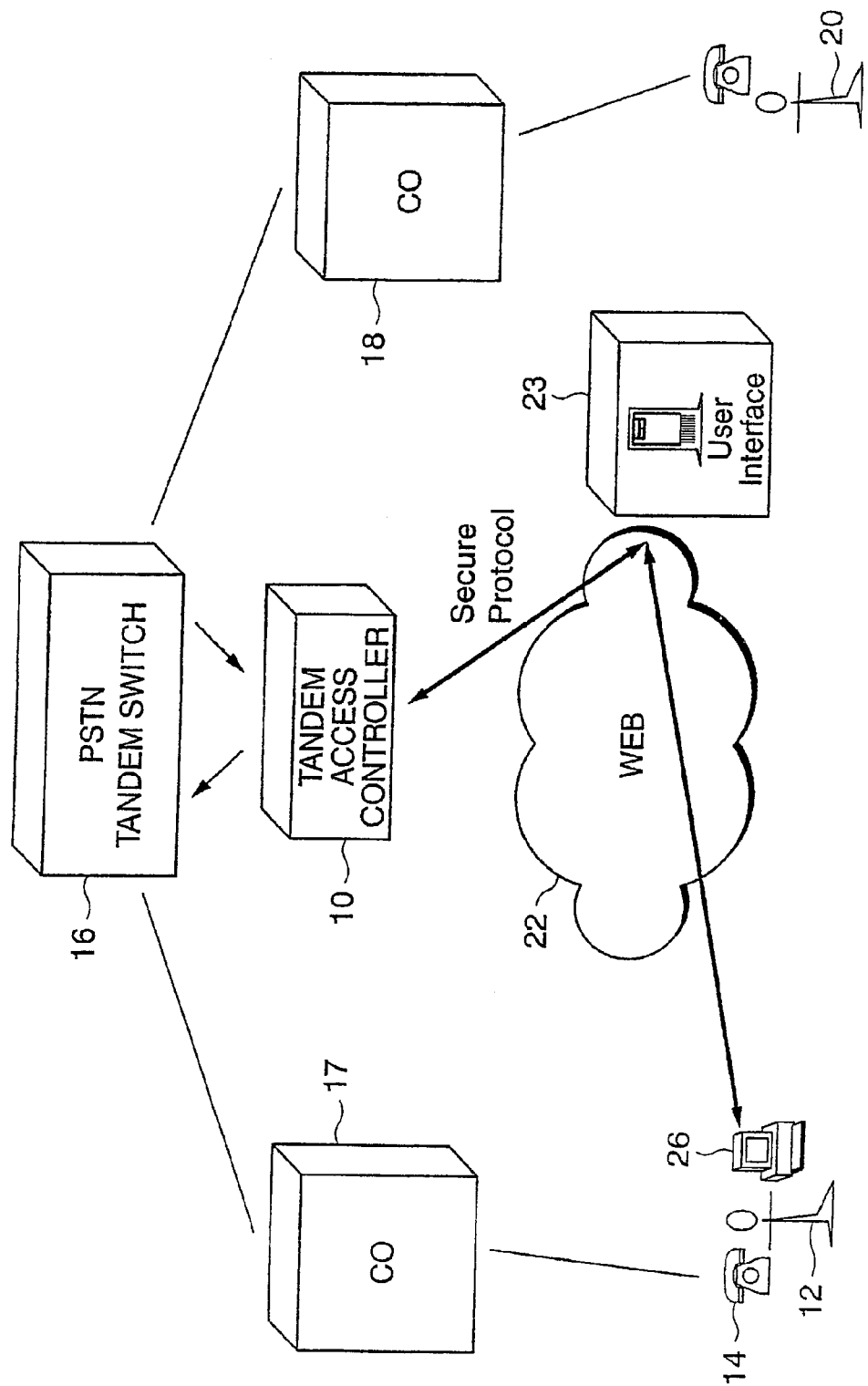
FIG. 1 illustrates the tandem access controller (TAC) in one embodiment of the present invention connected to the existing PSTN tandem switch, the TAC providing features for the subscriber's telephone as requested by the subscriber via the web.

FIG. 1 shows a tandem access controller (TAC) 10 that allows an authorized subscriber 12 to establish 3rd-party control criteria for calls to the subscriber's telephone 14 (having a "public" phone number that callers dial). In one embodiment, the TAC 10 is a programmed processor. The TAC 10 may use any combination of hardware, firmware, or software and, in one embodiment, is a conventional computer programmed to carry out the functions described herein.

The TAC 10 is connected to or inside the conventional PSTN tandem switch 16 such that calls may flow through the TAC 10 in the same manner as the existing PSTN tandem switch, except that additional 3rd-party features are applied to the call. As is well known, PSTN tandem switches are exchanges that direct telephone calls (or other traffic) to central offices 17,18 or to other tandem switches. Details of the operation of the existing phone network may be found in the publication entitled "New Net SS7 Tutorial," by ADC Telecommunications, copyright 1999, incorporated herein by reference. Additional details may be found in the numerous books describing the PSTN.

The PSTN tandem switch 16 directs a first call (from the calling party 20 to the subscriber's phone 14 using the subscriber's public phone number) to the TAC 10, which in turn places a second call, subject to 3rd-party control information, to the subscriber's "private" phone number without yet terminating the first call. The TAC 10 is connected within the subscriber's local service area so calls from TAC 10 to the subscriber do not incur a toll. When the subscriber 12 terminates (or answers) the second call, the TAC 10 terminates the first call and connects it to the second call, thereby connecting the calling party 20 to the subscriber 12. Hence, the calling party essentially calls the TAC 10, using the subscriber's public phone number, and the TAC 10, after processing the call using the selected features, calls the subscriber, as appropriate, using the subscriber's private phone number and connects the two calls. The process is transparent to the parties.

The TAC 10 is connected inside the PSTN in the sense that it is not an edge device such as a PBX or central office (CO) switch because it does not connect directly to subscribers. Rather, it redirects calls to subscribers. The TAC 10 provides intelligent interconnection between a calling party and a subscriber.

Figure 2:
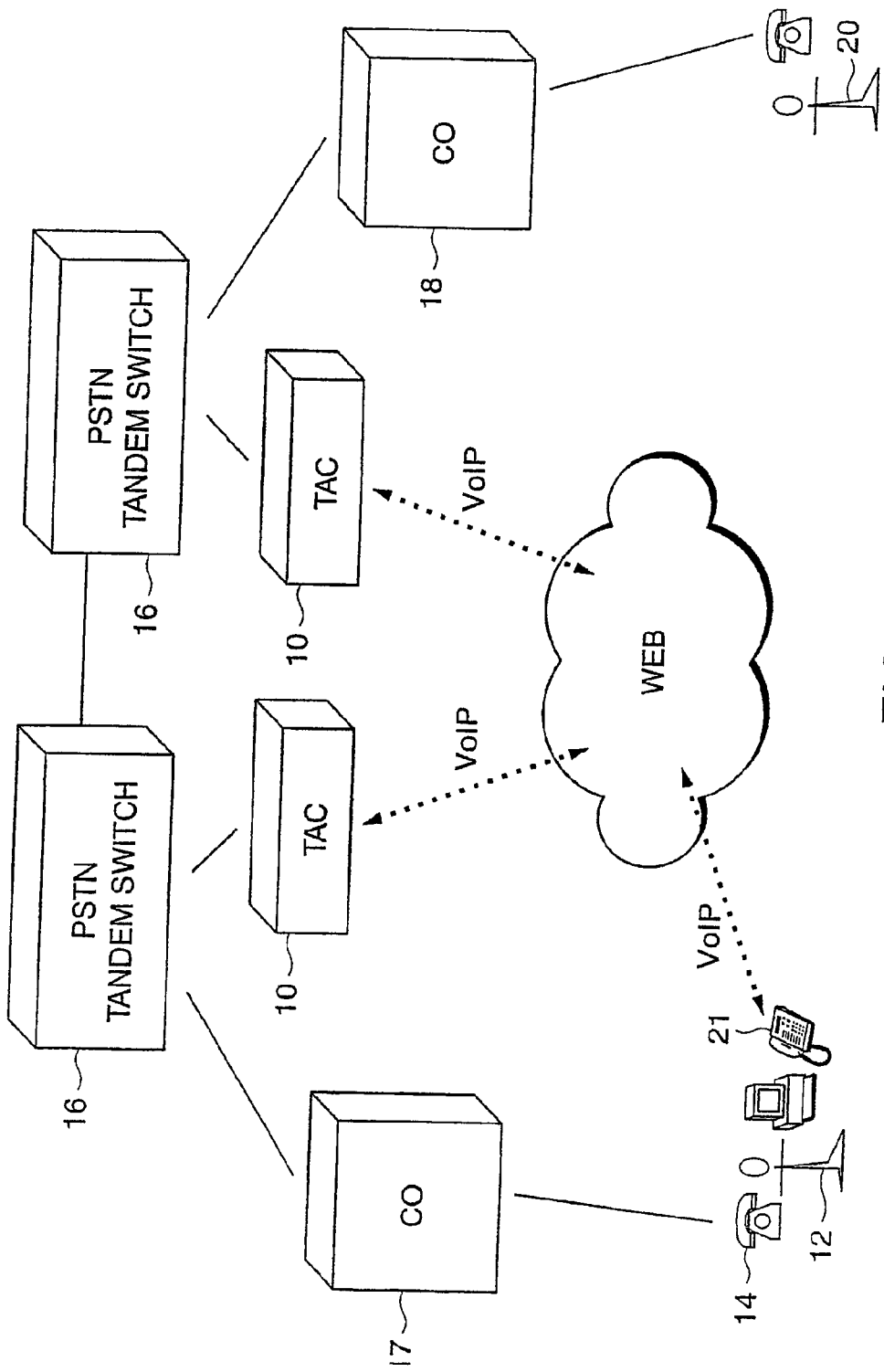
FIG. 2 illustrates a system similar to FIG. 1 but showing multiple tandem switches and TACs and also showing how the subscriber may, in additional to using the standard telephone, make phone calls using Voice Over IP via a conventional digital telephone.

The reader should keep in mind that although only one tandem switch 16 is shown in FIG. 1, the invention will apply equally well to a network of tandem switches, as shown in FIG. 2. FIG. 2 also illustrates how the subscriber can make calls using voice over IP via a conventional digital telephone 21.

FIG. 1 illustrates the preferred method for an authorized subscriber to modify the 3rd-party control criteria by means of the world wide web 22 (and web server 23) using an internet browser. By "authorized" we mean a subscriber who is registered and has logged-in with appropriate security and password controls. The subscriber 12 interacts with the web 22 via the Internet to quickly and easily specify the enhanced 3rd-party call control features. Web 22 then relays this information, in appropriate form, to the TAC 10. Preferably, the link to the TAC 10 uses a secure protocol. Examples of features that can be selected by the subscriber include: conditional call blocking, call forwarding, call altering, time of day conditions, day of week conditions, follow-me, caller recognition/password, caller ID, call screening/retrieval from voice mail, speed dialing, interactive voice response, and speech recognition. Any other feature could be added. These features can be implemented in the TAC 10 using known software techniques since such features are known. Message outgoing call control includes: click-to-dial calling and group calling/messaging.

The invention may also include ivr/vm/voverip.

Figure 3A:
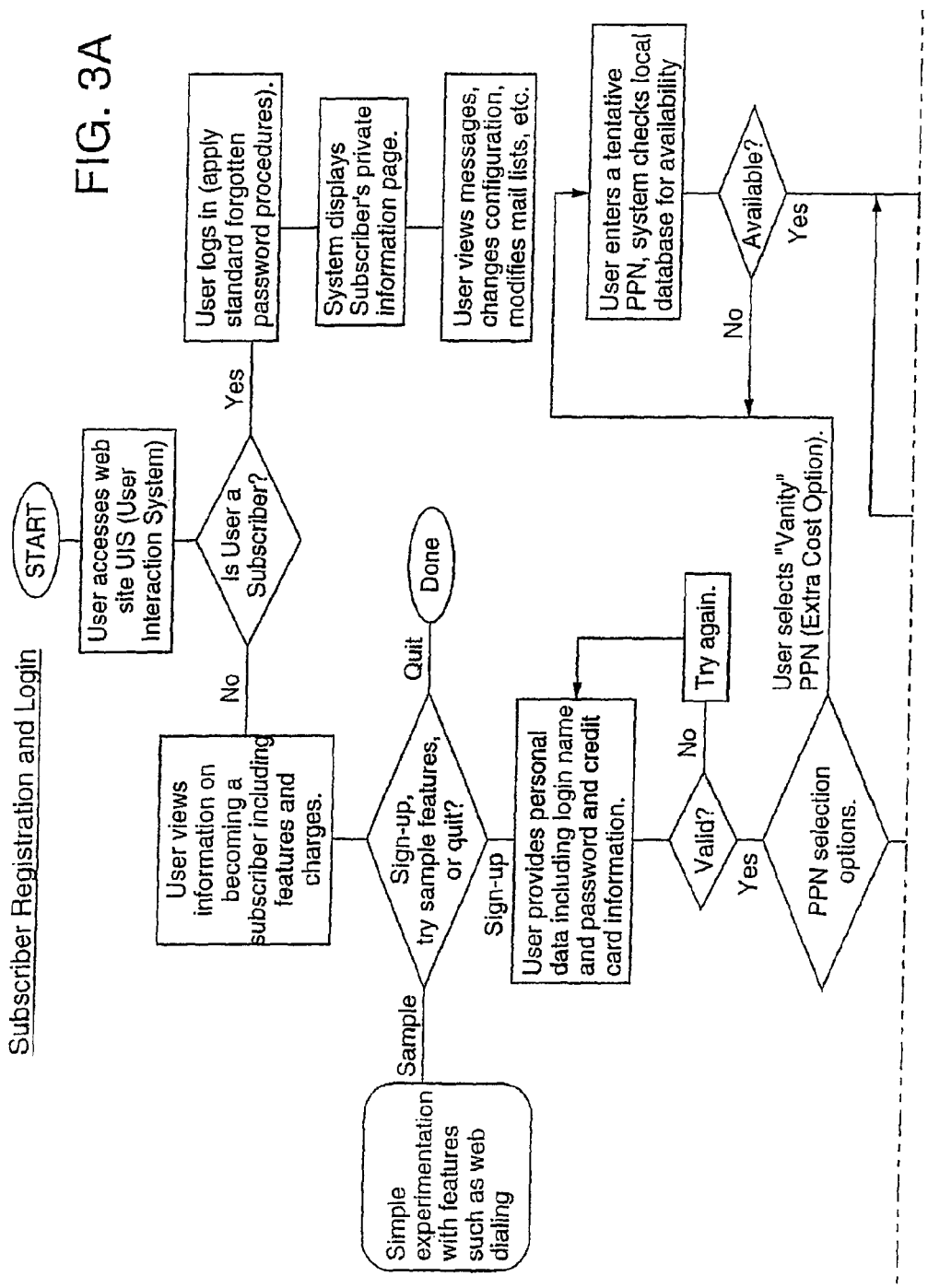

FIG. 1 uses a public internet portal connected via a data link to the TAC 10 or other interface system. As a registered subscriber, a user logs onto the portal (FIGS. 3A/3B) and is granted access, allowing the user to make additions or changes to features such as speed calling, call forwarding, selection of such descriptors as time of day, busy status, caller ID status, etc. A user-friendly web page leads the subscriber through the various procedures and available features. The selections made by the subscriber are translated into provisioning data and transmitted to the TAC 10. The TAC 10 in turn keeps track of incoming and outgoing calls based on this information.

The subscriber can also program a set of the call control features via a telephone link in the event a data link connection is unavailable.

Figure 4:
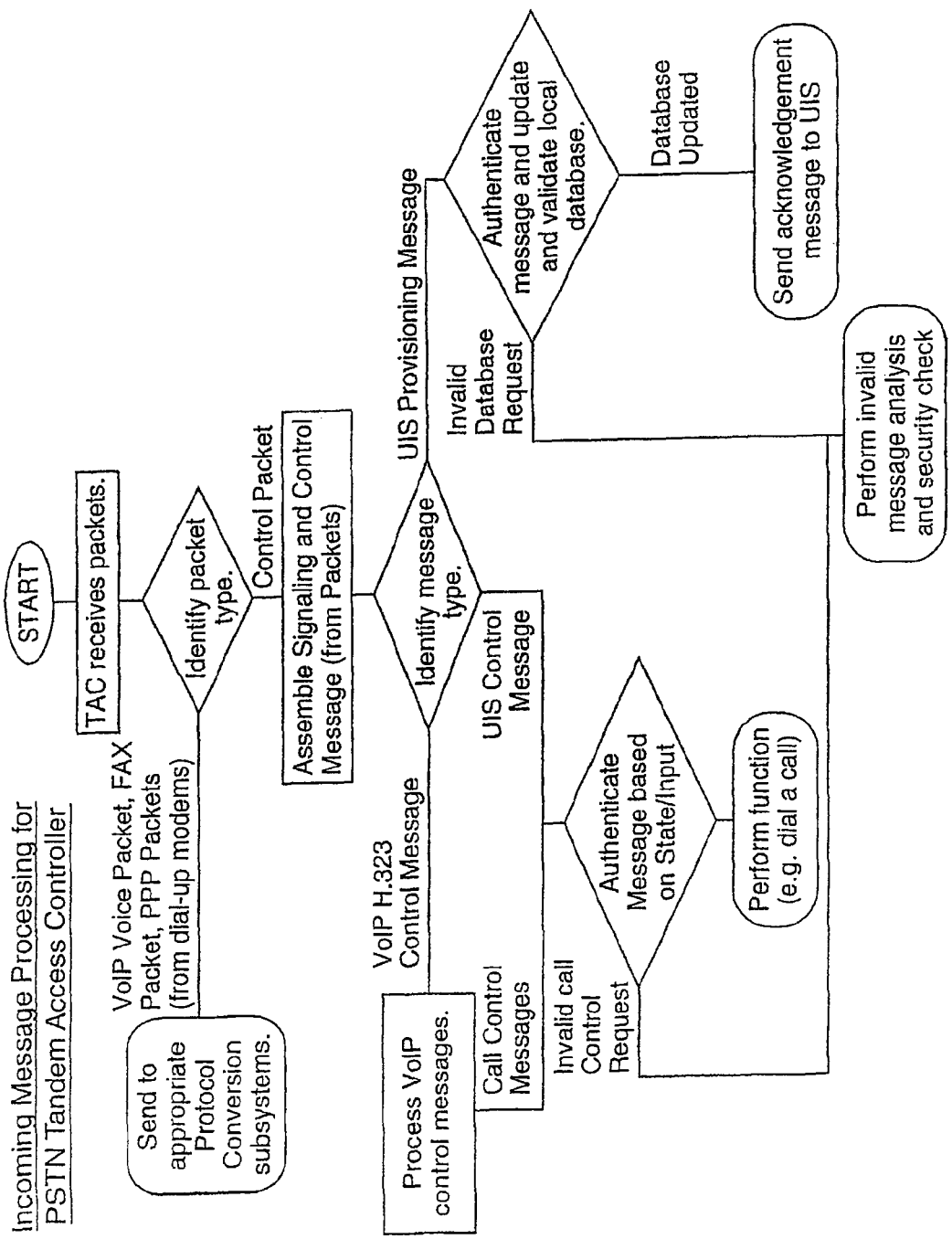
FIG. 4 is a flowchart of a method that can be performed by the TAC in response to the subscriber (or other service) controlling the TAC, using the web (or other packet-based system), to change the subscriber's telephone provisioning or perform another function, such as make a VoIP call.

FIG. 4 is a flowchart of actions that may be taken by the TAC 10 in response to the subscriber (or other service) controlling the TAC, using the web or other packet-based system, to change the subscriber's telephone provisioning or perform another function, such as make a VoIP call.

Figure 5:
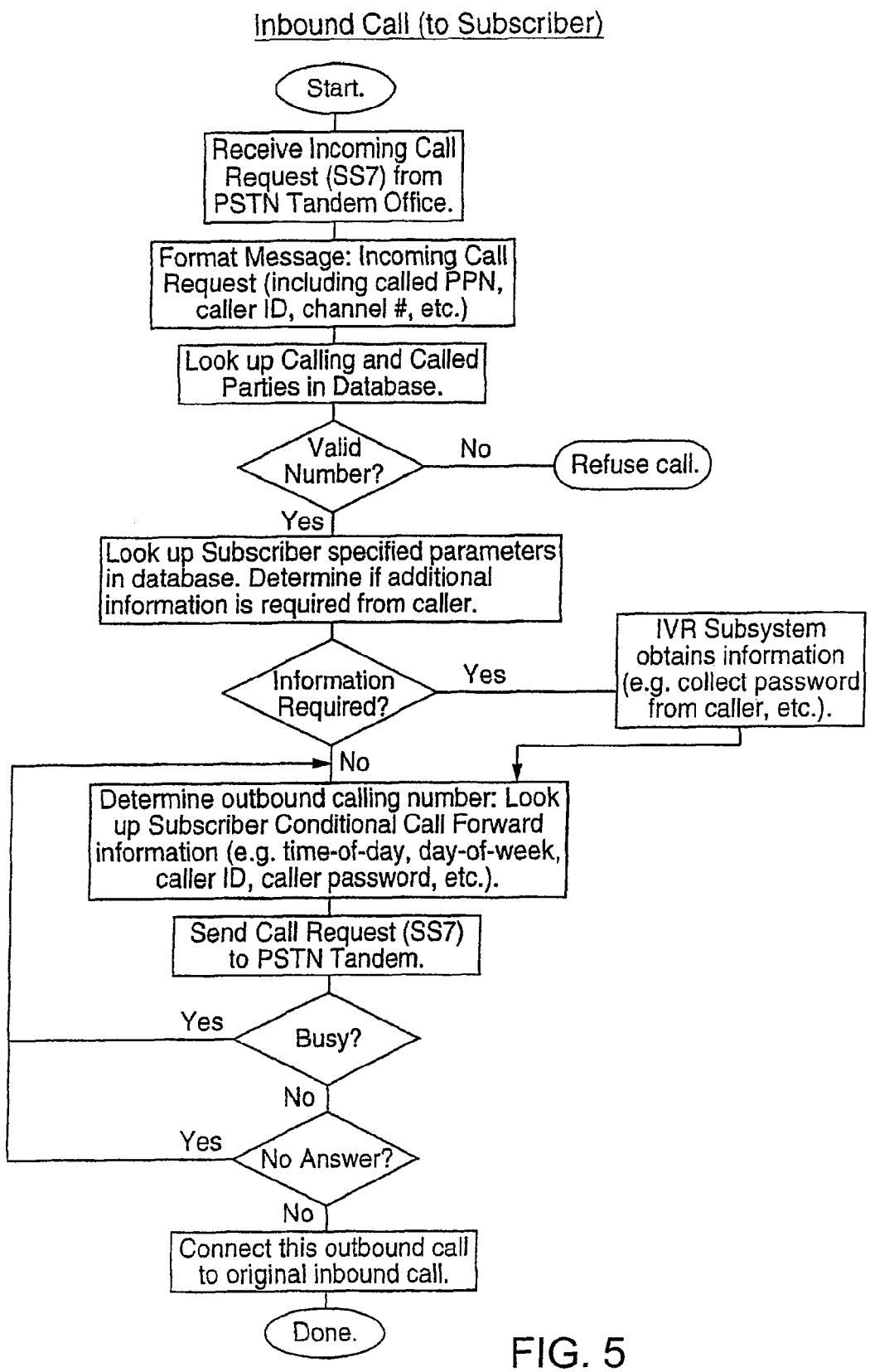
FIG. 5 is a flowchart of a method that can be performed by the TAC in response to an inbound call to the subscriber.

FIG. 5 is a flowchart of actions taken by the TAC 10 in response to an inbound call (using the subscriber's public phone number) to the subscriber. Examples of some of the actions taken by the TAC 10 are:
- Receives SS7 data indicating an incoming call
- Stores phone numbers downloaded from provisioning system
- Charts identity of calling party
- Checks time of day
- Stores lists of numbers in groups used for processing incoming calls
- Places outgoing calls in response to incoming calls according to information downloaded on the data link.

Incoming call data is received by the TAC 10 from the tandem switch 16. The TAC 10 processor checks calling and called numbers, class of service, time of day, number lists, etc. In some cases additional data is gathered from the calling party via a DSP (Digital Signal Processing) system and stored in the system memory. The DSP system is used to play call progress tones and voice announcements as required. Voice announcements can be played through the DSP system. In response to the call data, an outgoing call to the subscriber 12 may be placed back through the tandem switch 16 by TAC 10. The TAC 10 links the two calls and monitors the connection.

Information about the call may be collected by the TAC 10 and sent to the subscriber or a 3rd party for display. Such information may be the length of the call or information used to bill the subscriber for the use of the system. The provisioning system can also collect control information from a 3rd party and relay it back to the TAC 10, which will then affect the call accordingly.

Figure 6:
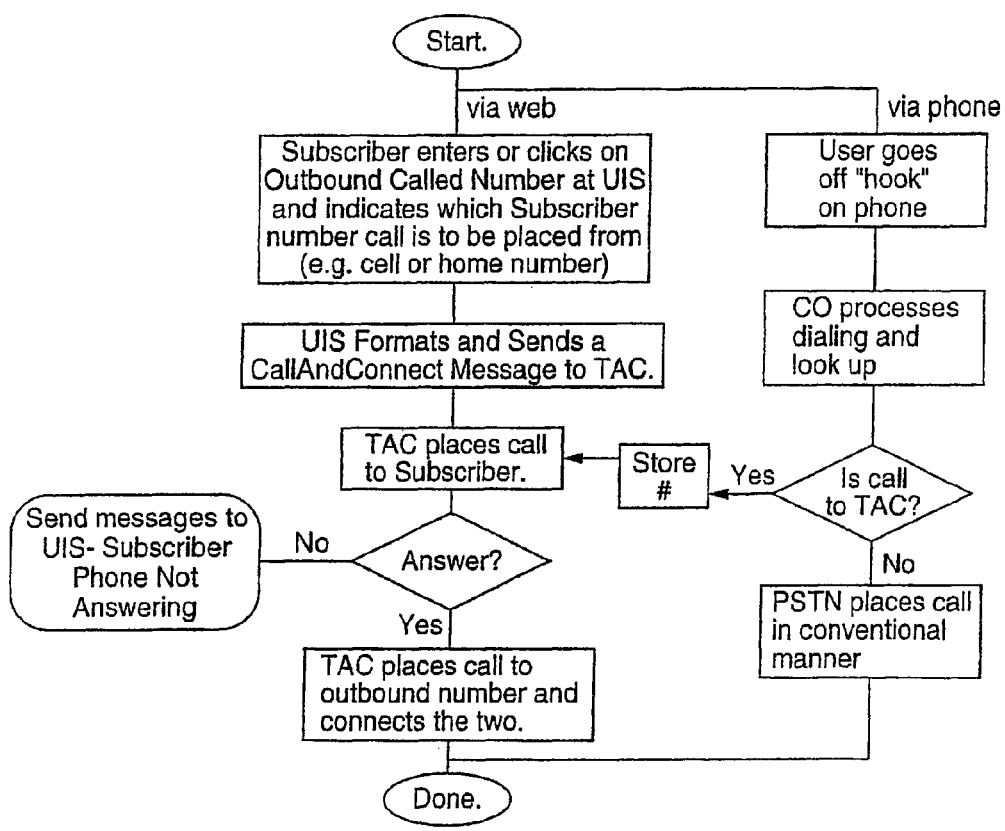
FIG. 6 is a flowchart of a method performed by the subscriber and the TAC when the subscriber desires to make an outbound call via the web or using a conventional telephone.

FIG. 6 is a flowchart of actions taken by the subscriber 12 and the TAC 10 when the subscriber desires to make an outbound call via the web or using a conventional telephone. When using the web to place a call, the subscriber may simply click a name on the computer screen 26 using a mouse.

Figure 7:
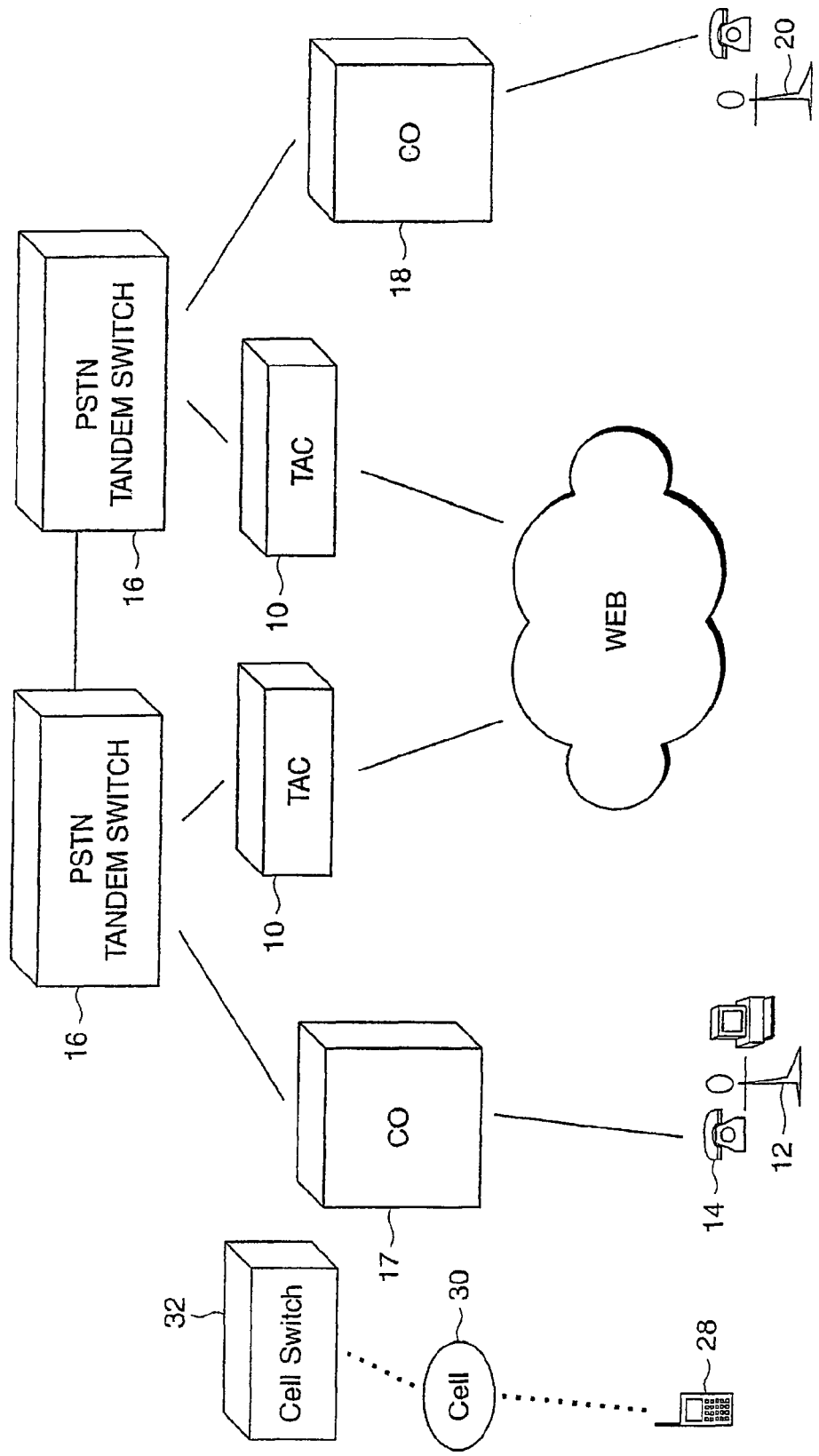
FIG. 7 illustrates a system, using the TAC, that allows wireless cell phones to obtain the same provisioning options as the conventional telephones.

FIG. 7 illustrates a system, using the TAC 10, that allows wireless cell phones 28 to obtain the same provisioning options as the conventional telephones 14. A local cell 30 and a cell switch 32 are also shown in FIG. 7.

Figure 8:
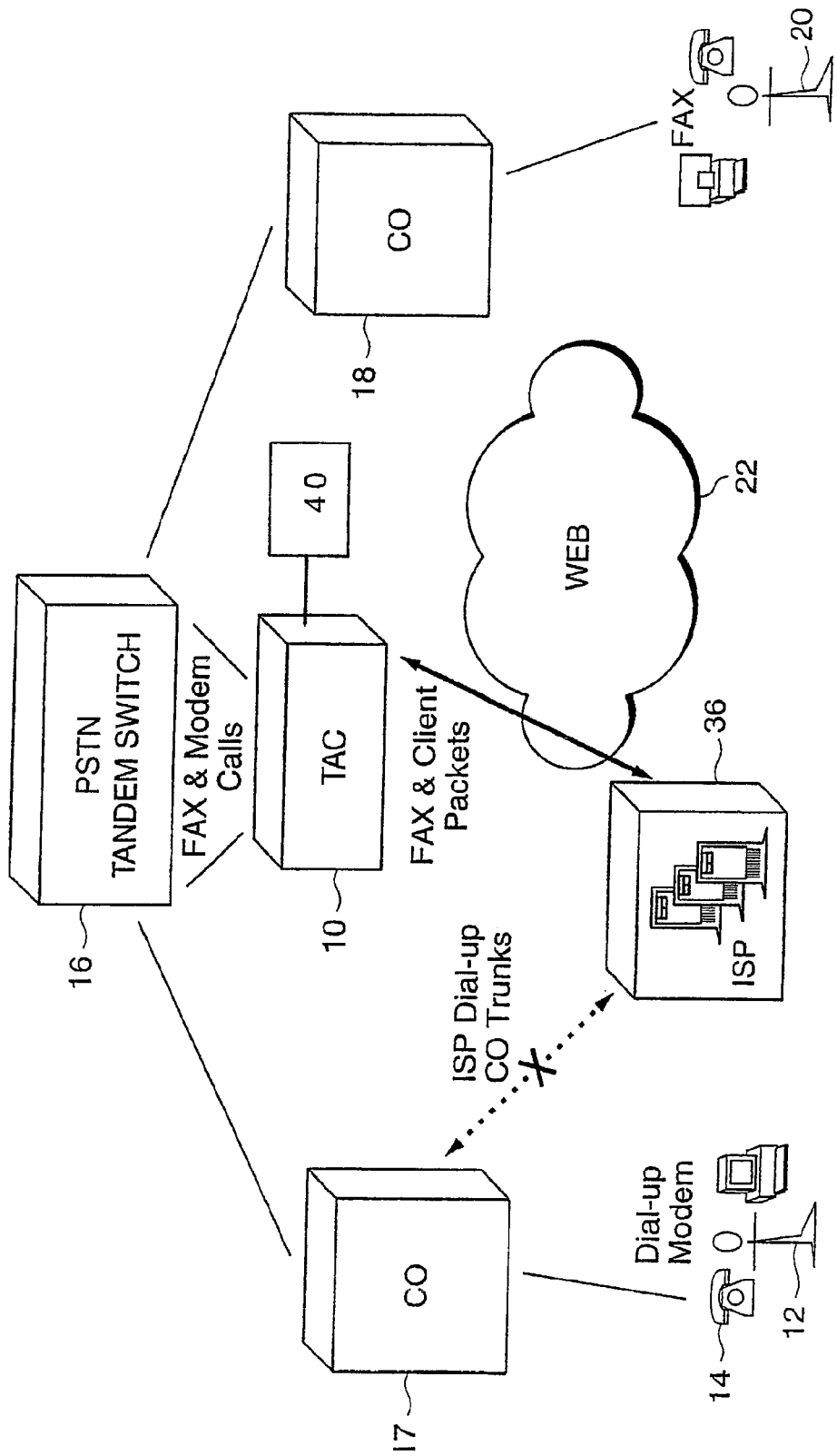
FIG. 8 illustrates a system, using the TAC, that allows fax and modem calls to benefit from the provisioning offered by the TAC.

FIG. 8 illustrates a system, using the TAC 10, that allows fax and modem calls to benefit from the provisioning offered by the TAC 10. The TAC 10 may interface the ISP 36 through the web 22.

One embodiment of the invention allows a subscriber to view the current state of his/her telephone via the Internet. Internet is a term of art by which we mean an interconnection of packet switched networks. Prior to this system there was no way for a user to examine the status of a telephone line. Recently, several products have been introduced that provide a means of examining the voice message boxes.

An internet portal is connected via a data link to the TAC 10. When a user logs onto the internet portal and is granted access to an individual subscription, the user can examine the status of calls/features. This information is transmitted from the TAC 10 to the web portal and translated into user viewables. The TAC 10 keeps track of incoming and outgoing calls based on this information.

The TAC 10 may be implemented using conventional processor hardware. The connection to the tandem switch 16 may be as simple as a telephone circuit, since the TAC 10 receives an incoming call from a caller and processes the call. Devising the software/firmware use to control the TAC 10 is well within the capability of those skilled in the art since the various control features that can be made available are generally already known.

Certain advantages that can be obtained using the invention include the following:
- Web-Based Telecom Navigator
  - Manage Incoming Call Control
    - Conditional Call Blocking/Forwarding/Alerting
    - Time-of-Day, Day-of-Week, Follow-Me, Caller Recognition/Password
    - Caller ID, etc.
    - Call Screening/Retrieval from Voice Mail
    - Interactive Voice Response and Speech Recognition
  - Manage Outgoing Call Control
    - Click-to-Dial Calling
    - Group Calling and Messaging
  - Web-Based Billing
- Web-Driven Personal Communications Management
  - Cost-Effective Single Phone Number Access
  - On-Line "Personal Digital Assistant"
  - On-Line "Telcom Navigator"
  - Inspired User Interaction
  - Secure and Reliable Technology
- Cost-Effective Single Phone Number Access
  - CLEC Status
    - Free Local Calls, Incoming Calls (not 800 Toll Service)
    - Retain Current Number (Local Number Portability)
    - Low-Cost Calling Throughout LATA
    - Flat-Rate Foreign Exchange
    - Single Installation Covers Entire LATA
    - VoIP Toll-Bypass
  - Compatible With Existing Devices, Standards
    - Standard DTMF and VoIP Phones
    - Wireless Phones
    - Standard Wired/Wireless and PIM Browsers
- Web-Based Personal Digital Assistant
  - Centralized and Consistent Personal Data
    - Build Once, Use Anywhere
    - Private/Public Phone Directories and Calendars
    - "Post-It" Style Annotation of Numbers
  - Web Dialing
    - Click-to-Dial from Web Pages, Directories, Calendars
    - Multiple Phone List Management
  - Unified Messaging
    - Voice Mail Access. Prompts, Alert Via Web
- User Interaction
  - Expected Behavior
    - Compatible with Familiar Products (e.g. Palm Pilot)
    - Commonality Between All Wired and Wireless
  - Mode-Based Definition and Selection
    - Vacation, Dinner Time, Go Away, Family Call Waiting
    - Templates
  - Learning Modes
    - Persona-Based User Interaction Design
    - Speech recognition
    - Windows drag and drop
  - Automatic Data Capture
    - Build Phone List Based on Collected Usage Information
    - Drag and Drop Into Lists Secure and Reliable Technology
    Separate Web-Site and Link Gateway
        No Direct External Access to Gateway
        Additional Security Layer
        No Denial-of-Service to Voice Links
    VoIP Link Degradation Detection
        Automatic Cutover to PSTN
    E-Commerce Security
        Billing Encryption Caller
ID Based Call Routing One advantage of using TAC 10 is its ability to enhance caller ID information. Caller ID is a common feature where a calling party's telephone number is transmitted to the called party's telephone so it can be displayed on a small display screen in the telephone. This caller ID information is provided by the calling party's central office switch. Signaling System No. 7 (SS7) is a global standard for telecommunications and defines the procedures and protocol by which network elements in the PSTN exchange information (including the caller ID) over the telephone network for call set up, routing, and control. In some telephone sets, including wireless telephones, the name of the caller associated with the telephone number is also displayed on the called party's display screen.

TAC 10 can use this automatically generated caller ID signal to provide an enhanced set of caller ID related features. One such feature is the association of the standard caller ID information with additional information about the caller stored in a memory addressed by TAC 10. The enhanced caller ID information provided through TAC 10 provides a valuable tool to the subscriber in handling incoming calls. The basic caller ID information, such as the caller's telephone number and name, can still be sent to the subscriber's phone and displayed in a conventional manner while the enhanced caller ID information may be displayed on the phone display or on the subscriber's computer monitor via the web.

The caller ID signals, pursuant to the SS7 protocol, are detected by TAC 10 when a calling party calls the subscriber using the subscriber's public telephone number, as previously described. TAC 10 then uses the basic caller ID data to address a look-up table (LUT) containing any additional information that the subscriber has entered into the LUT's memory locations for association with that caller ID data. FIG. 8 shows such a LUT 40 within or connected to TAC 10.

In one example, the subscriber may identify a prospective calling party's telephone number to TAC 10 via the Internet and then associate the number with any other information for storing in LUT 40. Such other information may be all the possible callers using the calling telephone, personal information regarding the calling party, billing information, business information, account numbers, past discussions with the caller, or any other information. When TAC 10 detects the caller ID signals, TAC 10 addresses LUT 40 and downloads the retrieved information to the subscriber's telephone display or to the subscriber's computer via the web. Since TAC 10 (including LUT 40) stores this additional information, the subscriber is not required to personally provide processing or memory devices for this feature.

Multiple subscribers use the same TAC 10 and LUT 40 but only the memory locations in LUT 40 authorized for access by a particular subscriber are available to that subscriber.

A subscriber may program TAC 10 using the various means described previously to perform any number of features on an incoming telephone call based upon the caller ID data. Such features include forwarding a call associated with that particular caller ID data to one or more other telephones, or blocking calls associated with that particular caller ID data. Such calls may be forwarded or blocked only at certain times or on certain days as requested by the subscriber. All of the other features previously described may also be applied based upon the caller ID.

When the calling party elects to block her caller ID information, displaying the caller's number and name on the subscriber's telephone may violate the privacy act, so such a restriction should be programmed into the system. However, TAC 10 may still use the caller ID information for various legal purposes. For example, the subscriber may not wish to receive phone calls from a particular phone number or calling party. The subscriber may transmit to TAC 10 the caller ID information (e.g., the telephone number and/or the name) and instruct TAC 10 to either forward the call, block the call, or transmit any additional information from LUT 40 to the subscriber's phone display or computer monitor for screening the caller.

If caller ID information does not exist, such as where the local telephone company does not offer caller ID, TAC 10, when receiving the incoming call, can transmit an automatic message to the caller to enter identification information. TAC 10 then uses that information to address LUT 40 to identify any associated information in LUT 40 for transmission to the subscriber. TAC 10, in a recorded or simulated voice, can request the caller to enter her phone number via the telephone keypad. Alternatively, TAC can request that the caller speak her name or number, which would then be played to the subscriber or converted to text or a code by TAC 10 to address LUT 40. Alternatively, the caller can enter a personal identification number or any other type of code (e.g., the caller's name) via the keypad, which would identify the caller to TAC 10. Once obtained, the caller ID information entered can be used to route the incoming call via TAC 10 in any way programmed by the subscriber. Call routing can be based on time of day, the caller ID, any web input instructions, a direction by the calling party itself, or any other variable.

This technique is contrasted with 800-type services, which are reverse long distance services requiring the owner of the 800 number to pay for the incoming call. With 800 numbers, the caller ID must be unblocked to identify the amount of the toll. With the inventive technique, even blocked caller ID calls can result in information about the caller being transmitted to the subscriber or used by TAC 10 to selectively perform a function.

Figure 9:
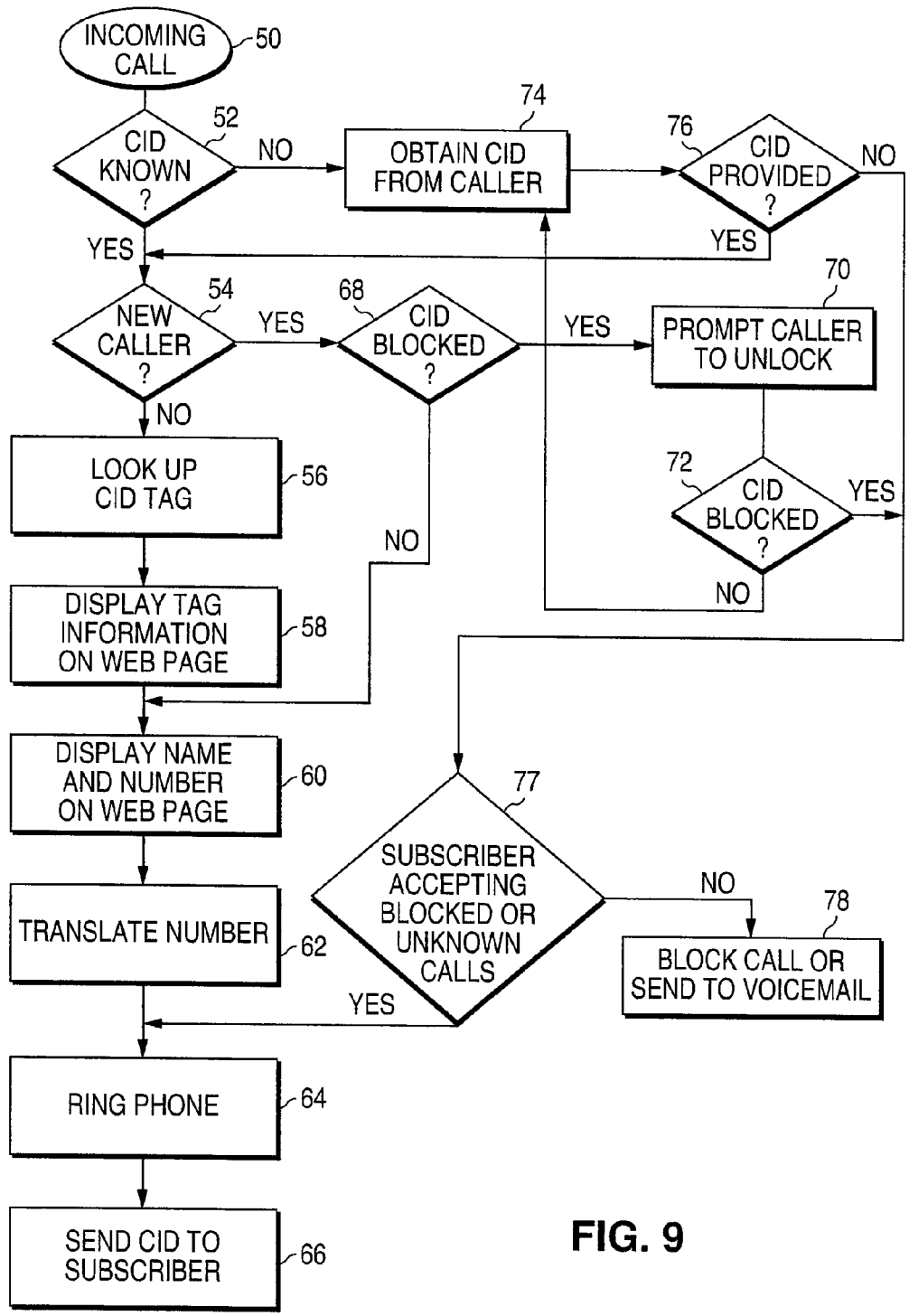
FIG. 9 is a flowchart of possible scenarios using the caller ID based feature.

FIG. 9 is a flowchart of various scenarios that may be carried out using the caller ID feature.

In step 50 of FIG. 9, an incoming call is received by TAC 10, as previously described, by a calling party calling the subscriber's public telephone number. In all embodiments described herein, the end unit called may be a residential telephone or other communication device connected to the PSTN via a central office, such as a computer, fax machine, or other communication device. The services provided by TAC 10 may be for residential telephone service or for business telephone service.

In step 52, using the SS7 protocol, TAC 10 detects the caller ID signal (CID), if any. Even if the calling party has a blocked CID, the CID is still transmitted to TAC 10; however the blocked caller ID cannot be displayed on the called party's telephone. If the CID is detected, the process continues to steps 54 and 56, which determine whether the CID is associated with any data in a look-up table. Existing data in the look-up table associated with the CID indicates that the caller is a previous caller. If caller ID information is known without ever previously receiving a call from that party, the additional information can still be entered into the look-up table, and the calling party will be treated as not a new caller in step 54.

Assuming the caller has information stored in the look-up table, this additional information is retrieved by TAC 10 and displayed on a web page (step 58) that is accessible by the subscriber via the web. In addition, the caller's name and telephone number may also by displayed (step 60). The information may also be transmitted to the subscriber's telephone for display.

In step 62, TAC 10 performs any programmed function on the call, such as forwarding the call to the subscriber's private telephone number or another number.

The placing of the second call by TAC 10 causes the called phone to ring (step 64) as well as causes the CID and additional information to be available to the subscriber (step 66) on the subscriber's telephone display. When the subscriber answers the phone, TAC 10 completes the connection between the two parties.

The retrieved information from LUT 40 that is transmitted over the web may appear as a screen pop-up on the subscriber's monitor. This CID information can then be reviewed and edited to include new information about the caller provided during the call. The subscriber then downloads this edited information to TAC 10 so future calls from the same caller would display the new information.

In step 54 if it is determined that the CID information is not associated with any existing information in the look-up table, TAC 10 determines whether the CID is blocked (identified in the SS7 protocol) in step 68. If the CID is not blocked, then the CID information is transmitted to the subscriber's telephone when TAC 10 places the call to the subscriber's private number (or any other forwarding number), and the CID is displayed on the subscriber's phone.

In step 68, if it is determined that the CID is blocked, TAC 10 will prompt the caller, via a recorded message or a simulated voice, to press the appropriate touch tone buttons to unblock the CID (step 70). For example, TAC 10 may be programmed to detect that a "1" key is pressed by the caller to unblock CID and then treat the CID information as unblocked. Alternatively, the caller may be required to call back after pressing the proper touch tone keys to unblock the CID in a conventional way.

In step 72, if the CID is now unblocked, the CID is obtained from the caller in step 74. The process also goes to step 74 if, in step 52, the CID is not initially obtained.

In step 76, TAC 10 determines whether the CID signal has been provided by the calling party from either the automatic CID signals or from the caller manually entering the caller's telephone number, name, or PIN, as previously described. If yes, then in step 54 TAC 10 uses the CID information to determine whether the caller is a new caller, and the remainder of the process continues as previously described.

In step 72, if it is determined that the CID remains blocked after TAC 10 has prompted the caller to unblock the CID, then in step 74 it is determined by TAC 10 is step 77 (after reviewing the subscriber's programmed instructions) whether the subscriber is accepting blocked calls. If yes, TAC 10 then places a call to the subscriber's private number or any other number identified by the subscriber, and puts the blocked call through. The blocked CID information would not be transmitted to the subscriber's phone.

If the subscriber's instructions are to not accept blocked calls, then in step 78 the blocked call is not forwarded to the subscriber's phone, or the blocked call is sent to voice mail. Voice mail may be a memory internal to TAC 10, or TAC 10 may transmit a special code to the subscriber's phone that automatically causes the call to be routed to a private voice mail system.

As seen, as long as the caller ID data received by TAC 10 has information associated with it in the look-up table, the stored information can be transmitted to the subscriber even if the caller ID is blocked. Further, even blocked caller IDs can still be used by TAC 10 to perform a routing function on the call. The caller ID feature may be implemented by a software program run by the processing system in TAC 10.

Because the conventional blocked CID information provided by the phone company is never displayed to the subscriber, the tagging system does not violate the privacy act. Known features such as call trace (where CID is provided to law enforcement people), or call return (where the blocked caller can be called back) have established a legal precedent that it is ok to use blocked CID information for certain purposes as long as the caller ID is not disclosed to the called party Branch Calling Branch calling is an enhanced telephone feature not believed to be provided on today's public telephone networks. This feature can be easily provided using TAC 10.

Branch calling is a technique where a caller places a first call intended for a called party to TAC 10. After receiving the call, TAC 10 looks up the call handling instructions programmed into TAC 10 by the subscriber via the web, via the telephone, or via any other technique. One set of these instructions is branch calling, which instructs TAC 10 to simultaneously call any number of different telephone numbers programmed into TAC 10 by the subscriber. The called phone numbers may be any combination of local, long distance, or cellular numbers.

When a party answers one of the ringing lines, the answering party is connected to the calling party, and the other calls are abandoned.

For branch calling to operate in the most desirable manner, the system must detect that a call has been answered in order to terminate the calls to the other telephones (or other end units). Accordingly, some form of answer supervision must be present. Answer supervision is implemented inside the PSTN but generally not available to private networks (e.g., PABXs). Since SS7 signaling supports answer supervision, it is easy for this branch calling feature to be provided through TAC 10 since TAC 10 is connected inside the PSTN.

Prior art systems without answer supervision must call each forwarding number sequentially, whereby after a certain number of preprogrammed rings, the calling stops and the next number is called until someone answers the phone. Because a ringing time-out must occur before the next call can be tried, an unrealistically long delay can occur before the call is placed to the proper telephone and finally answered. In contrast, the present invention allows TAC 10 to ring all the numbers simultaneously so the call can be answered quickly.

It is desirable that the answer supervision signaling not be delayed so that the calling and called parties may be connected quickly when the call is answered and so that during the delay time two parties do not answer two different ringing phones.

Figure 10:
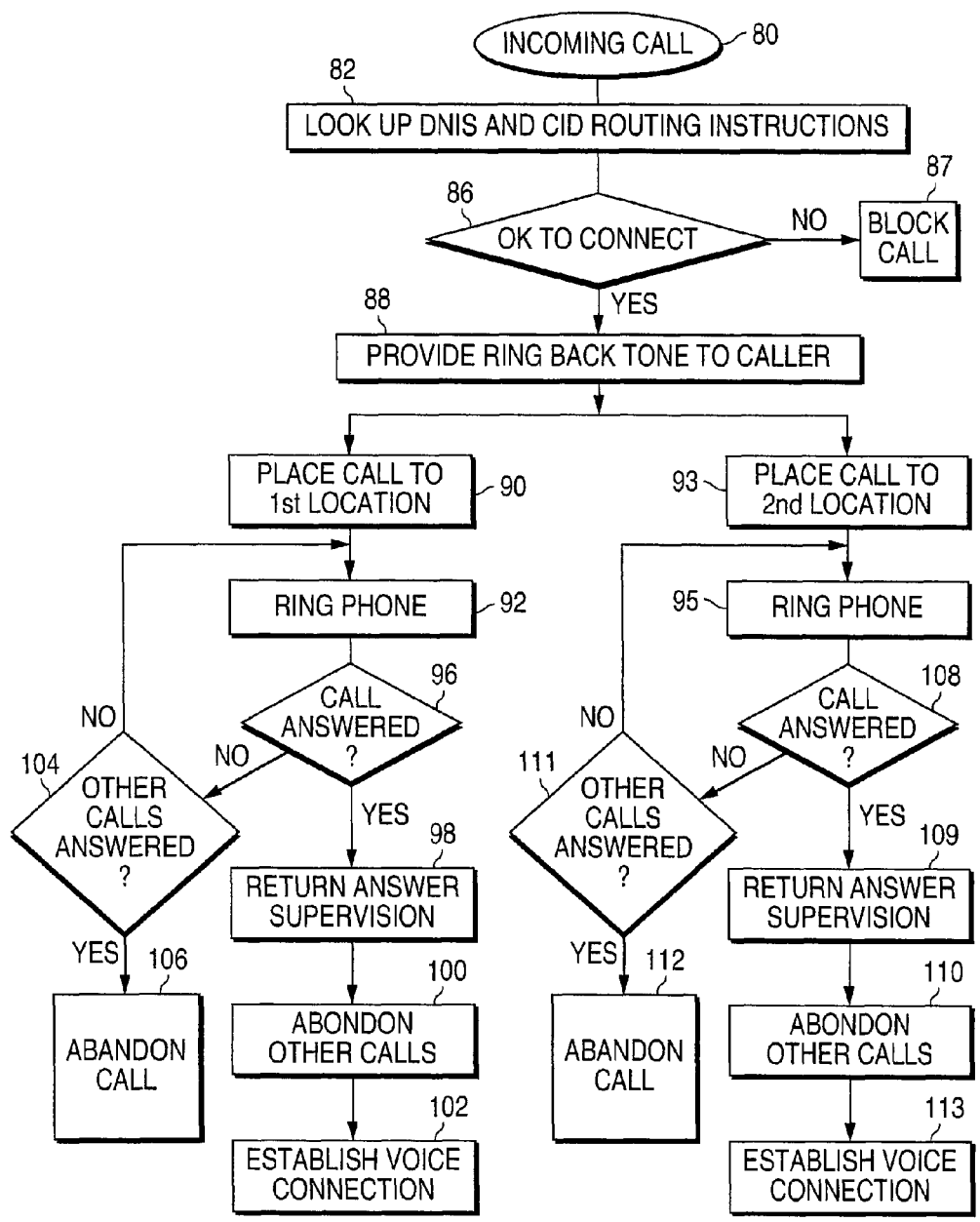
FIG. 10 is a flowchart of possible scenarios using the branch calling feature.

FIG. 10 is a flowchart of some scenarios in branch calling, whereby an incoming call to TAC 10 causes TAC 10 to place at least two new calls simultaneously and, when one of these phones is answered, the remaining calls are abandoned.

In step 80 of FIG. 10, TAC 10 receives an incoming call.

In step 82, TAC 10 looks up the routing instructions for the DNIS (Dialed Number Identification Service) and caller ID (if any). The DNIS identifies the number that was called, and the caller ID (CID) identifies the calling telephone number and sometimes the caller. DNIS works by transmitting the touch tone digits to TAC 10. A subscriber for TAC 10 may program TAC 10, as previously described, to perform any number of functions based upon the DNIS number, the CID, the time of day, or based upon any other factor. Such instructions may be stored in a look-up table addressed by the subscriber's public phone number (identified by the DNIS number). Since multiple subscribers will be using the same TAC 10, TAC 10 needs to know what number was dialed in order to perform the function on the call selected by the subscriber.

In step 86, TAC 10 identifies the features to apply to the incoming call. If the instructions are to block the call, then TAC 10 blocks the call in step 87. In the present example, it is assumed that the feature the subscriber wants to apply is a branch calling feature where two telephone numbers are to be called by TAC 10.

In step 88. TAC 10 generates a ring back tone to the caller to indicate that a telephone is ringing.

In step 90, TAC 10 places a call to a first telephone number, which causes the called phone to ring (step 92). Parallel operations are performed for a second phone number in steps 93 and 95.

In step 96, it is determined by TAC 10 whether the first phone has been answered using answer supervision signaling provided by SS7 (step 98).

In response to the answer supervision signaling, TAC 10 abandons the other call to the second telephone (step 100).

In step 102, TAC 10 completes the phone call by connecting the calling party to the answered telephone. This process may be applied to other than telephones, such as computers or other types of communication equipment.

In step 96, if the call is not answered after the ring, it is determined whether the other telephone has been answered (step 104). If not, the two phones continue to ring.

If it is determined in step 104 that another telephone has been answered (i.e., the answer supervision signal has been received by TAC 10), the call to the first telephone is abandoned (step 106).

The same operation is performed with respect to the second telephone call in steps 108-113.

Any number of telephone calls may be simultaneously placed by TAC 10 in response to a branch calling instruction, In step 86, if the instructions programmed by the subscriber are to block the call, then TAC 10 blocks the call in step 87.

While particular embodiments of the present invention have been shown and described, it will be obvious to those skilled in the art that changes and modifications may be made without departing from this invention in its broader aspects and, therefore, the appended claims are to encompass within their scope all such changes and modifications that fall within the true spirit and scope of this invention.

Acronyms

PPN—Public Phone Number allocated by oneCloud (known to public, on business cards, etc., rings oneCloud).

LPN—Local Phone Number from local telco (rings user's phone but is only known to oneCloud and local telco).

UIS—User Interaction System—web site user interfaces with in order to control phone features.

TAC—Tandem Access Controller—System that directly accesses the PSTN.

The invention claimed is:

1. A method of routing calls from a first network to a second network, comprising:
   receiving at a controlling device connected to a tandem switch, a first information relating to a call from a first user connected to the first network, the call being directed to a second user connected to the second network, wherein said receiving takes place prior to the second user answering the call;
   generating by the controlling device a second information, wherein the second information is a function of at least one control criteria available to the controlling device; and
   using the second information to process the call from the controlling device through the second network.

2. A method according to claim 1, wherein the controlling device enables a communication path between the first user on the first network and the second user on the second network.

3. A method according to claim 2, wherein the first network and the second network operate on disparate communications protocols.

4. A method according to claim 2, wherein the at least one control criteria has been previously made available to the controlling device.

5. A method according to claim 2, wherein the control criteria is provided to the controlling device through an Internet connection.

6. A method according to claim 2, wherein the at least one control criteria has been previously provided to the controlling device by either the first user or the second user.

7. A method according to claim 2, wherein the at least one control criteria has been previously provided to the controlling device by a service provider operating either the first network or the second network.

8. A method according to claim 2, wherein the call is not terminated unless the second user answers the call.

9. A method of routing calls from a first network to a second network, comprising:
   receiving, at a controlling device connected to a tandem switch within a PSTN network, a first information relating to a first call leg of a call from a first user connected to the first network, the call being directed to a second user connected to the second network, wherein the first information is received at the controlling device prior to reaching an end office in the PSTN network;
   generating by the controlling device a second information relating to a second call leg of the call, wherein the second information is a function of at least one control criteria available to the controlling device; and
   using the second information to process the call from the controlling device through the second network.

10. A method according to claim 9, wherein the call is not terminated unless the second user answers the call.

11. A method according to claim 10, wherein the first network and the second network operate on disparate communications protocols.

12. A method according to claim 11, wherein the at least one control criteria has been previously made available to the controlling device.

13. A method according to claim 12, wherein the control criteria is provided to the controlling device through an Internet connection.

14. A method according to claim 12, wherein the at least one control criteria has been previously provided to the controlling device by either the first user or the second user.

15. A method according to claim 12, wherein the at least one control criteria has been previously provided to the controlling device by a service provider operating either the first network or the second network.

* * * * *